United States Patent [19]
Roller

[11] 3,960,695
[45] June 1, 1976

[54] APPARATUS FOR THE ELECTROLYTIC PRODUCTION OF INSOLUBLE METAL HYDROXIDE

[76] Inventor: Paul S. Roller, 1440 N St., NW., Apt. 208, Washington, D.C. 20005

[22] Filed: Feb. 22, 1974

[21] Appl. No.: 444,790

[52] U.S. Cl. ............................. 204/227; 204/96; 204/275; 204/289
[51] Int. Cl.² ........................................ C25D 17/00
[58] Field of Search ............ 204/227, 289, 96, 275, 204/237

[56] References Cited
UNITED STATES PATENTS

| | | | |
|---|---|---|---|
| 2,216,167 | 10/1940 | Fisher | 204/227 X |
| 2,258,435 | 10/1941 | Adolph et al. | 204/289 |
| 2,681,884 | 6/1954 | Butler, Jr. | 204/289 X |
| 3,432,420 | 3/1969 | Pei-Tai Pan | 204/227 X |
| 3,715,290 | 2/1973 | Yokozeki et al. | 204/96 |

FOREIGN PATENTS OR APPLICATIONS

| | | | |
|---|---|---|---|
| 1,964,661 | 3/1971 | Germany | 204/96 |

*Primary Examiner*—G. L. Kaplan

[57] ABSTRACT

In the electrolytic production in water of insoluble metal hydroxide from the metal thereof, more especially of coagulant ferric hydroxide from iron, rectangular channels with flanking ribs provide for pre-established, uniform spacing of the electrode plates and intermediate binary wiping structures. Electrolytic current contact is protected against corrosion by a metallic embossment on the plates. Binary reciprocating wipers are at different wiping levels between successive plates and reversely directed to the opposite surfaces thereof. The wipers are urged against the plate surfaces by bilateral springs, as the surfaces recede due to thinning of the plates as they are consumed. Terminal panels, on which the wipers land after a reciprocating stroke, coextensively bound the plates; protuberances facilitate the transit of a wiper between them. The terminal panels may be employed to concurrently generate oxygen or chlorine as a supplement to coagulant ferric hydroxide.

14 Claims, 6 Drawing Figures

APPARATUS FOR THE ELECTROLYTIC PRODUCTION OF INSOLUBLE METAL HYDROXIDE

The invention relates to the electrolytic production of insoluble metal hydroxide in water from electrodes of the metal, and in particular to the production of iron hydroxide, a coagulant of suspended matter in water, from iron.

In an aqueous electrolytic cell of anodes and cathodes of a metal whose hydroxide is insoluble in water, the hydroxide is formed at the anode, while hydrogen is liberated at the cathode; the hydrogen is generally negligible. Examples of the metal in the field of water treatment, are iron and aluminum, of which the former is the most significant commercially. Iron forms at the anode ferrous hydroxide, which in the presence of oxygen in the water is instantly oxidized to ferric hydroxide. A coagulant of suspended matter in the water, the ferric hydroxide may also combine with phosphate in the water. Alternate to its production electrolytically, coagulant ferric hydroxide may be produced chemically, by the hydrolysis of ferric sulfate or chloride, or equivalently of aluminum sulfate.

All factors considered, iron to produce ferric hydroxide electrolytically is much cheaper than the equivalent chemical compounds; these are burdened with anion and water that greatly increase the ultimate user cost. Moreover, the electrolytic method has the advantage of avoiding acid and solubles added to the water.

Because of patent advantages of the electrolytic method, numerous attempts have been made to utilize it. These have, however, been nullified by augmenting power, due to an insulating, hard layer formed on the anode. I have previously found that, by removing a parent soft film, wiping of the electrode obviates the hard layer. The removal by wiping is greatly aided by reversal of the current, which may be considered an indispensable concomitant of the wiping; reversal of the current provides, moreover, for the same metal being employed both as anode and cathode.

As a metal plate is electrolytically consumed in producing the hydroxide, the surface of the plate recedes from the wiper; this, accordingly, is spring loaded. For spring-loaded wiping of an electrode plate to its very edges in reciprocating wiping, it is bounded by terminal panels on which the wipers may land at the end of a wiping stroke.

It is an object of the invention to provide for a least distance of separation of successive electrode plates, while including a wiper structure therebetween, whereby to reduce electrolytic resistance to a minimum.

Another object is to provide for self-controlled spacing of electrode plates and reciprocating wiper drive members therebetween.

Another object is to provide for wiping the opposite surfaces of successive electrode plates at an interplate distance no greater than that required for wiping but one surface.

A further object is to provide for stability of the wiper springs in reciprocating, spring-loaded wiping.

Still another object is to provide for unimpeded transit of wipers between an electrode plate and its bounding terminal panel.

Another object is to provide for non-corrosion of the contact between a current lead-in and electrode plate.

A still further object is to provide for the generation of oxygen concurrently with the electrolytic production of metal hydroxide.

With these and other objects in mind, as will become apparent from the description which follows, reference is made to the figures, in which similar parts are similarly numbered, and in which.

Figure 1:
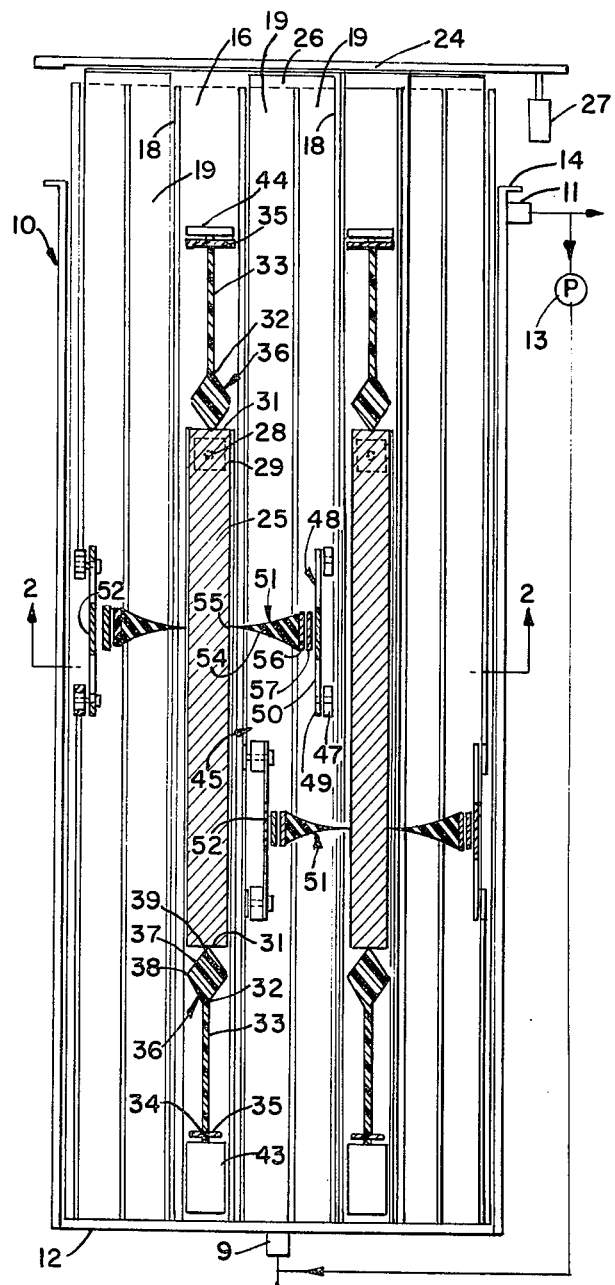
FIG. 1 is a view in elevation of the apparatus, taken in mid-section.
Figure 2:
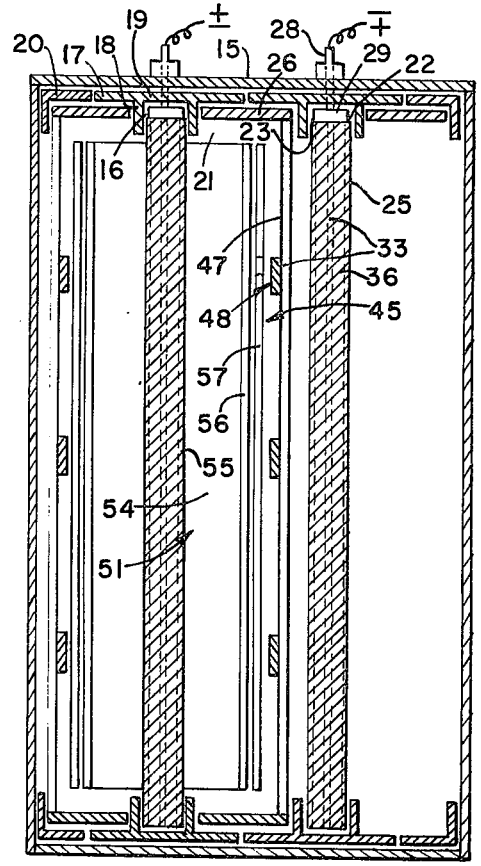
FIG. 2 is a plan view of the apparatus, taken in section on line 2—2 of FIG. 1.
Figure 3:
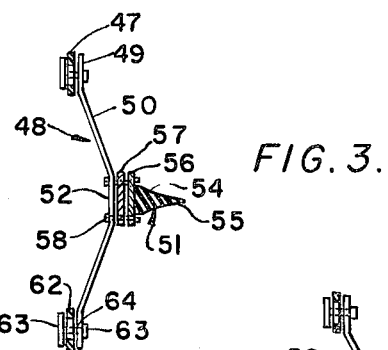
FIG. 3 is an end view showing a wiper bilateral spring.
Figures 5, 6:
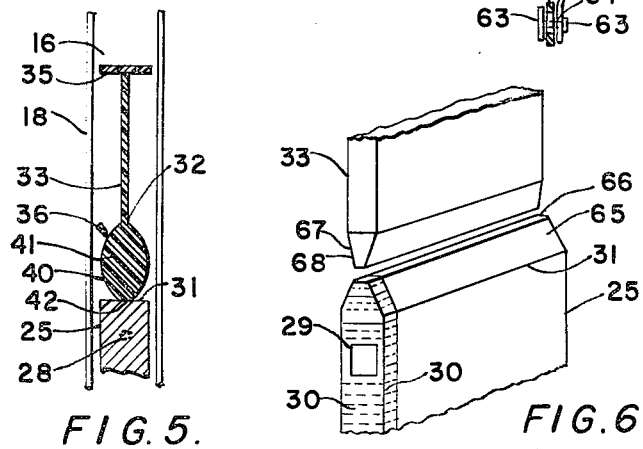
FIG. 5 is an end view showing a terminal panel and its bordering protuberance.
FIG. 6 is an isometric view illustrating an alternate electrode plate.
Figure 4:
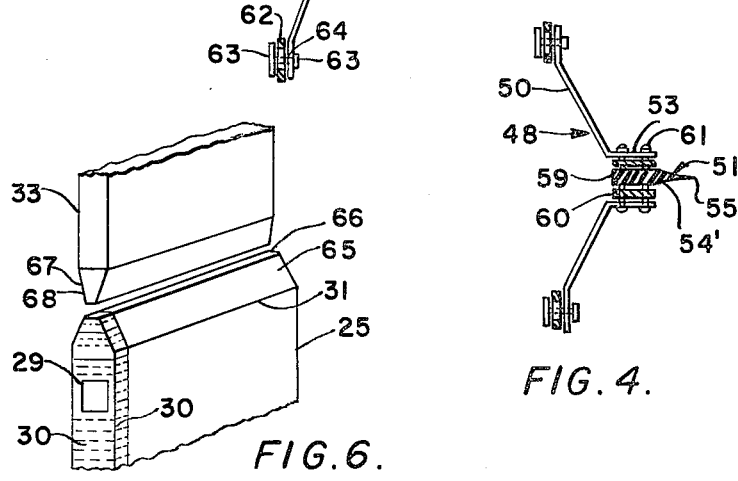
FIG. 4 is an end view showing a modification of said bilateral spring.

Having reference now to the figures, container 10 enclosing the electrolytic apparatus is provided with water inlet 9 on bottom 12 and water outlet 11 below rim 14. The water exiting in outlet 11 contains in suspension metal hydroxide, for example, coagulant ferric hydroxide; if this is to be concentrated, the water may be recirculated by pump 13 across the metal electrodes of the apparatus between outlet 11 and inlet 9.

A plurality of rectangular, matching channels 16, extending longitudinally from bottom 12 up to or above rim 14, is mounted at channel bases 17 on opposite side walls 15 of container 10, with channel walls 18 jutting inwardly of said container. Ribs 19, projecting from base 17, flank channel walls 18; and, successively in abutment, form bases 20 of longitudinal, matching recesses 21, the walls of which are identical with walls 18 of channels 16.

Electrode plates 25 are held by their side ends 22 and margins 23 in matching channels 16, while reciprocating wiper drive members 26 are situated in recesses 21 intermediate successive electrode plates 25. Matching channels 16 and recesses 21 provide for pre-established, uniform spacing of the plurality of electrode plates 25 and of intermediate wiper structures based on wiper drive members 26; these extend from below electrode plate 25 to above rim 14, whence they latch to beams 24. Power source 27, communicating with said beams, provides a longitudinally reciprocating motion to said wiper drive members.

Electrolytic current lead-ins 28 penetrate side wall 15 of container 10 and base 17 of channel 16 to make electrical contact with side ends 22 of electrode plates 25. The electrolytic current, which is reversing, is passed to said electrode plates either directly by current lead-ins 28 or indirectly through a series connection. Electrolytic current being obstructed from side ends 22 and margins 23 of electrode plates 25 in channels 16, these parts are subject to corrosion by the water. Embossment 29, a conductor, of stainless steel or similar non-corroding metal, is affixed, by welding, fastening or otherwise, to a small area on side end 22, and electrical contact by current lead-in 28 is made against said embossment. Furthermore, side ends 22, less embossment 29, and margins 23 may be coated with a corrosion-preventive finish 30, such as an epoxy paint.

Ends 31 of electrode plate 25 transverse to channels 16 may be adjacent the similarly transverse ends 32 of coextensive, bounding terminal panels 33. These being comparatively thin, protuberance 36 borders terminal panels 33 at said transverse end 32 and interposes it and said transverse end 31, to which it is contiguous. Protuberance 36 is of rigid, dielectric material, while terminal panel 33, which it borders, is rigid, and generally, though not necessarily, dielectric. Tee bar 35, which as reinforcement borders terminal panel 33 at its transverse end 34 opposite protuberance 36, is rigid, and also generally, though not necessarily, dielectric.

Protuberance 36 has a maximum mid-thickness equal to that of electrode plate 25; from the corresponding summit, the thickness decreases to a verge at one end equal to the thickness of terminal panel 33, and to a verge at the other end equal to the thickness of a consumed, remnant electrode plate 25.

Protuberance 36 is in a preferred form represented by prism 37, whose maximum mid-thickness is the distance between opposite vertices 38, the edges of which may be blunted; from said vertices as summits, the sides of prism slope to opposite vertices 39 as said verges. In an alternate form, protuberance 36 is represented by cylindroid 40, which may reduce to a cylinder, whose maximum mid-thickness is the distance between oblate ends 41 and whose verges are prolate ends 42.

Terminal panels 33 fit snugly in channels 16, through protuberance 36 and tee bar 35 abutting walls 18 of said channels. From the under end of lower terminal panel 33, tee bar 35 rests against foot-supports 43 situated in matching channels 16 on bottom 12 of container 10. Lid 44 in matching channels 16 presses on tee bar 35 of upper terminal panel 33; transmitted to foot-support 43, the lid pressure serves to secure electrode plate 25 and bounding terminal panels 33 in said channels.

Binary wiper structure 45 is intermediate successive electrode plates 25 and consists of two components, which are quite similar, but distinguished by their wipers being at different longitudinal levels and reversely directed to the opposite surfaces of said electrode plates. Each said component comprises: a wiper backing represented by two longitudinally separated backing strips 47, adjacent a plate surface and extending transversely between wiper drive members 26 to which they are attached in channels 16; a plurality of planar, bilateral springs 48, extending uniformly along backing strips 47 and connected across them at spring ends 49; and a wiper 51, extending transversely between walls 18 of matching channels 16 and connected to said bilateral springs, which urge said wiper against a plate surface opposite that adjacent said backing strips. The clearance between backing strips 47 and the adjacent plate surface and between successive bilateral springs 48 along said backing strips allows for the passage of water flowing between electrode plates 25.

Bilateral springs 48 include spring arms 50, which project obliquely from spring ends 49 to a mid-part, from which is transmitted the force of the spring to wiper 51. In a preferred form, said mid-part is a longitudinal length 52 of said spring, extending between the ends of spring arms 50; alternately, it comprises longitudinally separated, horizontal spring stubs 53, forming the ends of said projecting spring arms.

Wiper 51, which is of rubber or other like flexible material, comprises a shaped strip 54 or 54', which tapers to an anterior wiping edge 55 from a posterior end that is adapted to be connected to said mid-part of bilateral spring 48. With respect to spring length 52 as said mid-part, the posterior end of wiper 51 comprises wiper base 56; backed by rigid strip 57, this is connected to each spring length 52 of the plurality of bilateral springs 48 by fastenings 58 applied to it, said rigid strip and said spring lengths. With respect to stubs 53 as said mid-part, the posterior end of wiper 51 comprises slab 59; supported between rigid strips 60, this is connected between stubs 53 of each of the plurality of bilateral springs 48 by fastenings 61 applied to it, said rigid strips and said stubs.

Though spring arms 50 are oblique to spring ends 49, upon placement between new electrode plates 25 they retract into a profile that is collinear with spring ends 49, as shown in FIG. 1. In accordance with this condition, bilateral springs 48 occupy very little of the regular interplate distance, especially when spring length 52 constitutes the mid-part of said springs; moreover, only one wiper 51 contributes to the regular interplate distance, since the two wipers 51 of binary wiper structure 45 are longitudinally apart. The longitudinal separation is, nevertheless, compatible with complete wiping of electrode plates 25, because of the presence of terminal panels 33 on which each of the separated wipers 51 lands after passing a transverse end 31 of said electrode plates.

As electrode plates 25 are being used up and hence thin, spring arms 50 assume an increasingly oblique profile as they urge wiper 51 against the receding plate surface; simultaneously, the linear distance between spring ends 49 decreases. The change in linear distance is accommodated to by having said spring ends movable on backing strips 47. The latter for this purpose may be provided with oblong openings 62, in which fastenings 63 move freely in response to movement by spring ends 49, to which said fastenings are attached by their restraint in narrow openings 64 of said spring ends.

A complete, longitudinal wiping stroke may be divided into the factors of push and pull. These differ in their effect on a free-ended wiper spring, in that the push tends to cause it to bulge toward the electrode plate being wiped, and even to contact it at a close interplate distance. The spring is stabilized and the bulge avoided in the case of bilateral spring 48, since by its longitudinal symmetry it accepts similarly and equably both push and pull.

Electrode plate 25 being normally thicker than terminal panel 33, wiper 51 on its return stroke from said terminal panel is impeded by the confronting, transverse end 31 of said electrode plate. The impedance is overcome by the presence of protuberance 36, inasmuch as wiper 51 glides from terminal panel 33 to the summit of said protuberance and thence downward to transverse end 31 and the surface of electrode plate 25; the glide of wiper 51 is similar in the reverse transit from electrode plate 25 to terminal panel 33. The facilitation by gliding of the transit between electrode plate 25 and terminal panel 33 induced by protuberance 36 is maintained, if not enhanced, as said electrode plate thins in use.

Protuberance 36 serves, furthermore, to skim wiper 51 of adhering matter by the action of its summit on wiper 51 passing over it. The skimming is particularly effective in the case of prism 37, in view of the angularity of vertices 38.

Electrode plate 25 may be provided with bevel 65 at each of its transverse ends 31, as alternate to the employment of protuberance 36. Edge 66 of said bevel is in contact with transverse end 32 of terminal panel 33 and may be blunted to match the thickness of said terminal panel. The juxtaposition of bevel 65 and transverse end 32 forms a hollow across which wiper 51 may pass uniformly in both wiping directions. Transverse end 32 may, as required, be provided with bevel 67, the edge 68 of which is in contact with edge 66 of bevel 65. The juxtaposition of said edges forms another hollow across which wiper 51 may uniformly transit.

Bevel 65 provides for skimming of wiper 51 by the action of transverse end 31, through its edge protruding above the hollow between said transverse end and terminal panel 33.

Employed during electrolytic operation, wipers 51 may, particularly when electrode plates 25 are of iron, be applied also during electrolytic non-operation, the object being to mitigate corrosion of such plates that occurs when they are idle in water. The water may at the same time, or independently, be treated with a corrosion inhibitor, or for the inhibited removal of oxide which may have formed.

During non-operation, iron electrode plates 25 may alternately be protected from corrosion cathodically. Terminal panels 33 in this instance, instead of being dielectric, are of non-corrodible, conducting material, such as alloy steel or carbon, and are interconnected to form a consolidated anode. Electrode plates 25 are interconnected and made a consolidated cathode during the period of non-operation.

Terminal panels 33 as consolidated anode may be employed also during electrolytic operation, in order to generate oxygen for the complete oxidation of initially formed ferrous hydroxide, and, as desired, to oxidize organic matter in the water. In the instance of water flowing from inlet 9 upward, preferably only the upper terminal panels 33 on the far end of electrode plates 25 serve as said anode. The cathodes thereto comprise those electrode plates 25, which happen to be cathode between current reversals. The electrical circuit between the consolidated anode of terminal panels 33 and said cathodes of electrode plates 25 may be different from that between said electrode plates themselves in the production of metal hydroxide.

In the presence of sodium chloride in the water, or added in limited amount, chlorine may be generated at said upper terminal panels as a disinfecting supplement to electrolytic ferric hydroxide coagulant.

The various advantages of the apparatus will be understood from the discussion which has accompanied the description. It will be recognized that modifications may be made in particular parts and arrangements thereof that are within the skill of the art, and fall within the spirit and scope of the invention as claimed.

I claim:

1. An electrolytic apparatus for producing insoluble metal hydroxide in water from electrodes of the metal, which comprises a plurality of electrode plates of the metal; electrolytic current lead-ins for said plates; a binary wiping structure intermediate successive said plates, which is comprised of similar components, the wipers of which are at different wiping levels and reversely directed to the opposite surfaces of successive said plates; reciprocating wiper drive members intermediate successive said plates; as to each said component, connected to said wiper drive members a wiper backing adjacent a plate surface; a plurality of bilateral springs along said backing and connected thereto at both spring ends; and connected to said plurality of bilateral springs a wiper, which is urged by said springs against a plate surface opposite that to which said backing is adjacent.

2. Claim 1, including rectangular matching channels in which the opposite ends and margins thereto are held; each said matching channel provided with ribs flanking the walls of the channel and projecting from the base thereof; successive said ribs in abutment forming the bases of matching recesses, the walls of which are identical with said channel walls; said reciprocating wiper drive members being situated in said matching recesses.

3. Claim 2, in which the base of a said channel is penetrated by said electrolytic current lead-in, which thereupon makes electrical contact with an end of said electrode plate in said channel.

4. Claim 3, in which said end of said electrode plate is provided with a non-corrodible, metal embossment against which said electrical contact is made.

5. Claim 4, in which said end of an electrode plate, less said embossment, and the margin thereto are coated with a corrosive-preventive finish.

6. Claim 1, wherein dielectric terminal panels coextensively bound each said electrode plate at its opposite ends, each said adjacent an end of said terminal panel, said ends transverse to the direction of said reciprocating drive members.

7. Claim 6, in which said end of a terminal panel is bordered by a protuberance that interposes it and said opposite end of an electrode plate, said protuberance having a maximum mid-thickness equal to the thickness of said electrode plate.

8. Claim 7, in which said protuberance comprises a prism, whose maximum mid-thickness is the distance between medially opposite vertices.

9. Claim 7, in which said protuberance comprises a cylindroid, whose maximum mid-thickness is the distance between medially opposite oblate ends.

10. Claim 6, in which said opposite ends of each electrode plate are in the form of a bevel, the edge of which is adjacent said end of said terminal panel.

11. Claim 10, in which the edge of said bevel is blunted, to match the thickness of said terminal panel.

12. Claim 10, in which said end of said terminal panel is in the form of a bevel, the edge of which is adjacent the edge of said plate bevel.

13. Claim 7, in which said terminal panels are alternately of non-corrodible, conducting material, and are interconnected to form a consolidated anode to those of said electrode plates that are cathode.

14. Claim 1, including pump means to recirculate the water across said electrode plates between an inlet for water and an outlet for water containing metal hydroxide in suspension.

* * * * *